United States Patent
Ichihara et al.

(10) Patent No.: US 12,103,168 B2
(45) Date of Patent: Oct. 1, 2024

(54) ROUTING-MEMBER GUIDE STRUCTURE AND WORKING MACHINE

(71) Applicant: KUBOTA CORPORATION, Osaka (JP)

(72) Inventors: Akihiro Ichihara, Osaka (JP); Kenzo Kusama, Osaka (JP); Junichi Fujiwara, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/983,496

(22) Filed: Nov. 9, 2022

(65) Prior Publication Data

US 2023/0060330 A1 Mar. 2, 2023

Related U.S. Application Data

(63) Continuation of application No. PCT/JP2021/017562, filed on May 7, 2021.

(30) Foreign Application Priority Data

May 11, 2020 (JP) .................. 2020-083086

(51) Int. Cl.
*F16M 11/00* (2006.01)
*B25J 19/00* (2006.01)

(52) U.S. Cl.
CPC ................. *B25J 19/0041* (2013.01)

(58) Field of Classification Search
CPC ....... B25J 19/0041; E02F 3/325; E02F 9/006; E02F 9/2275; E02F 3/384
See application file for complete search history.

(56) References Cited

U.S. PATENT DOCUMENTS 5,108,253 A * 4/1992 Kobayashi ............ E02F 9/2271
414/694
6,758,024 B1 * 7/2004 Mieger ..................... E02F 3/38
52/839
(Continued)

FOREIGN PATENT DOCUMENTS

CN 103717806 A 4/2014
JP 2004-353401 A 12/2004
(Continued)

OTHER PUBLICATIONS

International Search Report and Written Opinion of the international Searching Authority issued in International Patent Application No. PCT/JP2021/017562, dated Jun. 29, 2021, along with an English translation thereof.

(Continued)

*Primary Examiner* — Amy J. Sterling
(74) *Attorney, Agent, or Firm* — Greenblum & Bernstein, P.L.C.

(57) ABSTRACT

A routing-member guide structure includes a movable member pivotably supported by a fixed-side member; a first routing member routed on or along the movable member; and a guide member to guide the first routing member. The movable member includes a first wall portion and a second wall portion facing each other with an interval therebetween. The guide member is inserted, in a direction intersecting the extending direction of the first routing member having been routed between the first wall portion and the second wall portion, into a space between the first wall portion and the second wall portion and is fixed to the movable member so as to guide the first routing member between the first wall portion and the guide member.

8 Claims, 13 Drawing Sheets

(56) References Cited

U.S. PATENT DOCUMENTS

| | | | |
|---|---|---|---|
| 11,384,867 B2 * | 7/2022 | Relph | F16L 3/1211 |
| 11,592,122 B2 * | 2/2023 | Relph | F16L 3/1211 |
| 2010/0158653 A1 * | 6/2010 | Webb | E02F 9/2275 |
| | | | 414/722 |
| 2014/0140799 A1 | 5/2014 | Moriguchi et al. | |
| 2015/0132095 A1 | 5/2015 | Takemura et al. | |

FOREIGN PATENT DOCUMENTS

| | | |
|---|---|---|
| JP | 2005-232712 A | 9/2005 |
| JP | 2013-237996 A | 11/2013 |
| JP | 2015-94159 A | 5/2015 |
| JP | 2016-75042 A | 5/2016 |
| KR | 10-2009-0107743 A | 10/2009 |

OTHER PUBLICATIONS

International Preliminary Report on Patentability issued in International Patent Application No. PCT/JP2021/017562, dated Nov. 15, 2022.
Extended European Search Report issued in European Patent Application No. 21804186.1, dated Jun. 13, 2024.

\* cited by examiner

ROUTING-MEMBER GUIDE STRUCTURE AND WORKING MACHINE

CROSS REFERENCE TO RELATED APPLICATIONS

This application is a continuation application of International Application No. PCT/JP2021/017562, filed on May 7, 2021, which claims the benefit of priority to Japanese Patent Application No. 2020-083086, filed on May 11, 2020. The entire contents of each of these applications are hereby incorporated herein by reference.

BACKGROUND OF THE INVENTION

1. Field of the Invention

The present invention relates to a routing-member guide structure and a working machine including the guide structure.

2. Description of the Related Art

In the related art, the working machine disclosed in Japanese Unexamined Patent Application Publication No. 2005-232712 is known.

In the working machine disclosed in Japanese Unexamined Patent Application Publication No. 2005-232712, a swing bracket (movable member) is pivotably supported at a support bracket (fixed-side member) provided on a machine body, and a hydraulically driven working device is attached to the swing bracket. In the working machine, a plurality of hydraulic hoses (routing members) for supplying and discharging a hydraulic fluid with respect to a hydraulic actuator that drives the working device are routed at the working device from the machine body through the swing bracket.

SUMMARY OF THE INVENTION

In a working machine in the related art, a swing bracket is provided with a hose guide, since the swing bracket moves with respect to a support bracket, to restrict the paths of hydraulic hoses and prevent interference and the like between the hydraulic hoses. The hose guide is assembled to the swing bracket before the hydraulic hoses are routed. Therefore, there is a problem that assembling properties of the hydraulic hoses are poor in the related art since the hydraulic hoses are required to be routed by passing between the hose guide in a state of being assembled to the swing bracket and a wall portion around the hose guide.

Preferred embodiments of the present invention provide improved assembling properties of routing members.

A routing-member guide structure according to one aspect of the present invention includes: a movable member pivotably supported by a fixed-side member; a first routing member routed on or along the movable member; and a guide member to guide the first routing member. The movable member includes a first wall portion and a second wall portion facing each other with an interval therebetween. The guide member is inserted, in a direction intersecting an extending direction of the first routing member having been routed between the first wall portion and the second wall portion, into a space between the first wall portion and the second wall portion and is fixed to the movable member so as to guide the first routing member between the first wall portion and the guide member.

The guide member is inserted at one end portion thereof into a hole on one side surface of the movable member or on a first attachment member attached to the one side surface of the movable member and supported at the one end portion thereof in the hole, and is fixed at another end portion thereof by a fastener to another side surface of the movable member or to a second attachment member attached to the other side surface of the movable member.

An end portion of the first routing member is provided with a joint to connect the first routing member to another member. An interval between the first wall portion and the guide member is narrower than a width of the joint in a direction orthogonal to the extending direction of the first routing member.

The routing-member guide structure includes a second routing member routed between the first routing member and the second wall portion. The guide member is inserted into a space between the first routing member and the second routing member that have been routed between the first wall portion and the second wall portion.

The guide member is a first guide member closer to the first wall portion between the first wall portion and the second wall portion. The routing-member guide structure includes a second guide member closer to the second wall portion between the first wall portion and the second wall portion. The first routing member is routed between the first wall portion and the first guide member. The second routing member is routed between the first guide member and the second guide member. A third routing member is routed between the second guide member and the second wall portion.

The second guide member is extended in a direction intersecting an extending direction of the second routing member and is offset from the first guide member in the extending direction of the second routing member.

The first routing member is routed on one side surface side or another side surface side of the movable member from between the first wall portion and the second wall portion, and the routing-member guide structure includes a clamp to clamp the first routing member routed on the one side surface side or the other side surface side of the movable member.

A working machine according to one aspect of the present invention includes: a machine body; the aforementioned routing-member guide structure; a support bracket defining the fixed-side member provided at the machine body; and a swing bracket, defining the movable member, supported by the support bracket to be rotatable around a pivot whose axis extends in an up-down direction.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
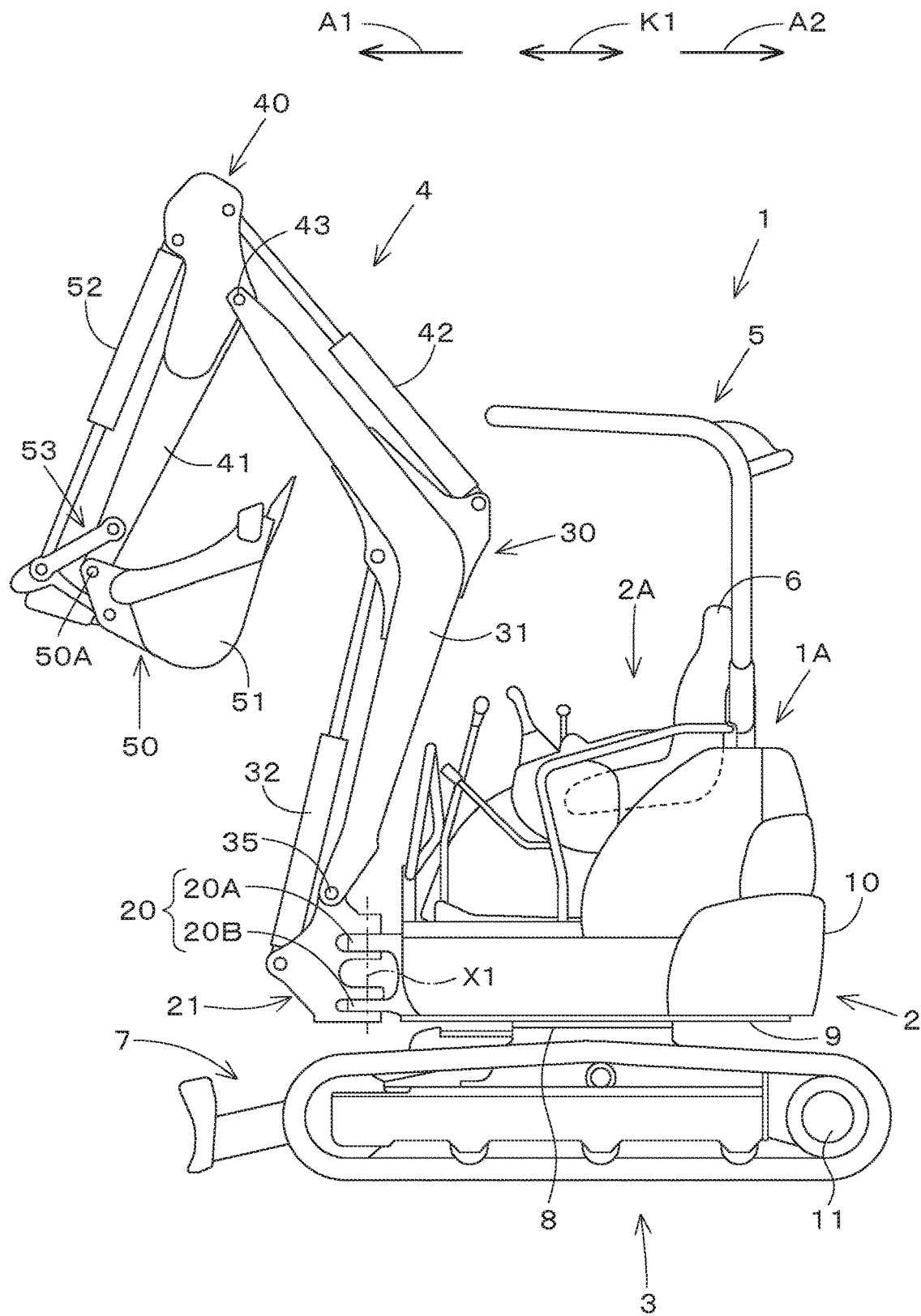
FIG. 1 is a side view of a working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinafter, one embodiment of the present invention will be described with reference to the drawings, as appropriate.

FIG. 1 is a schematic side view of a working machine 1 according to the present embodiment. In the present embodiment, a backhoe, which is a swiveling work machine, is presented as an example of the working machine 1.

As illustrated in FIG. 1, the working machine 1 includes a traveling body 1A and a working device 4 installed on the traveling body 1A. The traveling body 1A has a traveling device 3 and a machine body (swivel base) 2 mounted on the traveling device 3. On the machine body 2, an operation section 2A that includes an operator's seat 6, and a canopy 5 that covers a portion above the operator's seat 6 are mounted.

In the present embodiment, the front side (arrow A1 direction in FIG. 1) of an operator sitting on the operator's seat 6 will be described as the front, the rear side (arrow A2 direction in FIG. 1) of the operator will be described as the rear, and the arrow K1 direction in FIG. 1 will be described as the front-rear direction (the front-rear direction of the machine body). Further, the left side (near side in FIG. 1) of the operator will be described as the left, the right side (far side in FIG. 1) of the operator will be described as the right, and the horizontal direction, which is a direction orthogonal to a front-rear direction K1, will be described as the machine-body width direction (the width direction of the machine body 2). A direction from a central portion of the machine body 2 in the width direction toward a right portion or a left portion will be described as a machine-body-width-direction outward. A direction opposite the machine-body-width-direction outward will be described as machine-body-width-direction inward. In other words, the machine-body-width-direction inward is a direction that is in the machine-body width direction and that is toward the center of the machine body 2 in the width direction.

As illustrated in FIG. 1, the traveling device 3 supports the machine body 2 to enable the machine body 2 to travel therewith. The traveling device 3 is driven by a traveling motor 11 defining a hydraulic motor (hydraulic actuator), an electric motor, or the like. Although a crawler traveling device is used as the traveling device 3 in the present embodiment, the traveling device is not limited thereto, and a wheeled traveling device or the like may be used. On a front portion of the traveling device 3, a dozer device 7 is mounted.

The machine body 2 includes a swiveling base 9 defining a bottom portion and formed of a steel sheet or the like. The swiveling base 9 is supported on the traveling device 3 via a swivel bearing 8 so as to be capable of swiveling around an axis that extends in the up-down direction. A weight 10 is provided at the rear of the machine body 2. In addition, a prime mover is mounted at the rear of the machine body 2. The prime mover is a diesel engine. The prime mover may be a gasoline engine or an electric motor and may be of a hybrid type having an engine and an electric motor.

The machine body 2 includes, at a front portion thereof, a support bracket (fixed-side member) 20 to support the working device 4, and a swing bracket (movable member) 21. The support bracket 20 projects forward from the machine body 2. The support bracket 20 includes a first bracket portion 20A and a second bracket portion 20B below the first bracket portion 20A with an interval therebetween. To the first bracket portion 20A and the second bracket portion 20B (a front portion of the support bracket 20), the swing bracket 21 is attached so as to be capable of swinging around a swing axis X1, which is a vertical axis that extends in the up-down direction. The swing bracket 21 is driven by a swing cylinder (not illustrated) that is a telescopically movable hydraulic cylinder. The telescopic motion of the swing cylinder causes the swing bracket 21 to swing leftward and rightward around the swing axis X1.

As illustrated in FIG. 1, the working device 4 includes a boom assembly 30, an arm assembly 40, and a working tool assembly 50. The boom assembly 30 includes a boom 31 and a boom cylinder 32. A base portion of the boom 31 is supported by an upper portion of the swing bracket 21 to be capable of swinging (to be rotatable) via a lateral axial shaft 35 extending in the machine-body width direction. The boom cylinder 32 is a telescopically movable hydraulic cylinder extending from the swing bracket 21 to an intermediate portion of the boom 31. The boom cylinder 32 telescopically moves to cause the boom 31 to swing.

The arm assembly 40 includes an arm 41 and an arm cylinder 42. A base end portion of the arm 41 is swingably supported via a lateral axial shaft 43 by a leading end portion of the boom 31. The arm cylinder 42 defines a telescopically movable hydraulic cylinder extending from a base portion of the arm 41 to an intermediate portion of the boom 31. The arm cylinder 42 telescopically moves to cause the arm 41 to swing.

The working tool assembly 50 includes a bucket 51, as a working tool, and a bucket cylinder 52, as a working tool cylinder. The bucket 51 is swingably supported by a leading end portion of the arm 41 via a pivot 50A. The bucket cylinder 52 defines a telescopically movable hydraulic cylinder extending from a link mechanism 53 provided between the bucket 51 and the leading end portion of the arm 41 to the base portion of the arm 41. The bucket cylinder 52 telescopically moves to cause the bucket 51 to swing.

Figure 2:
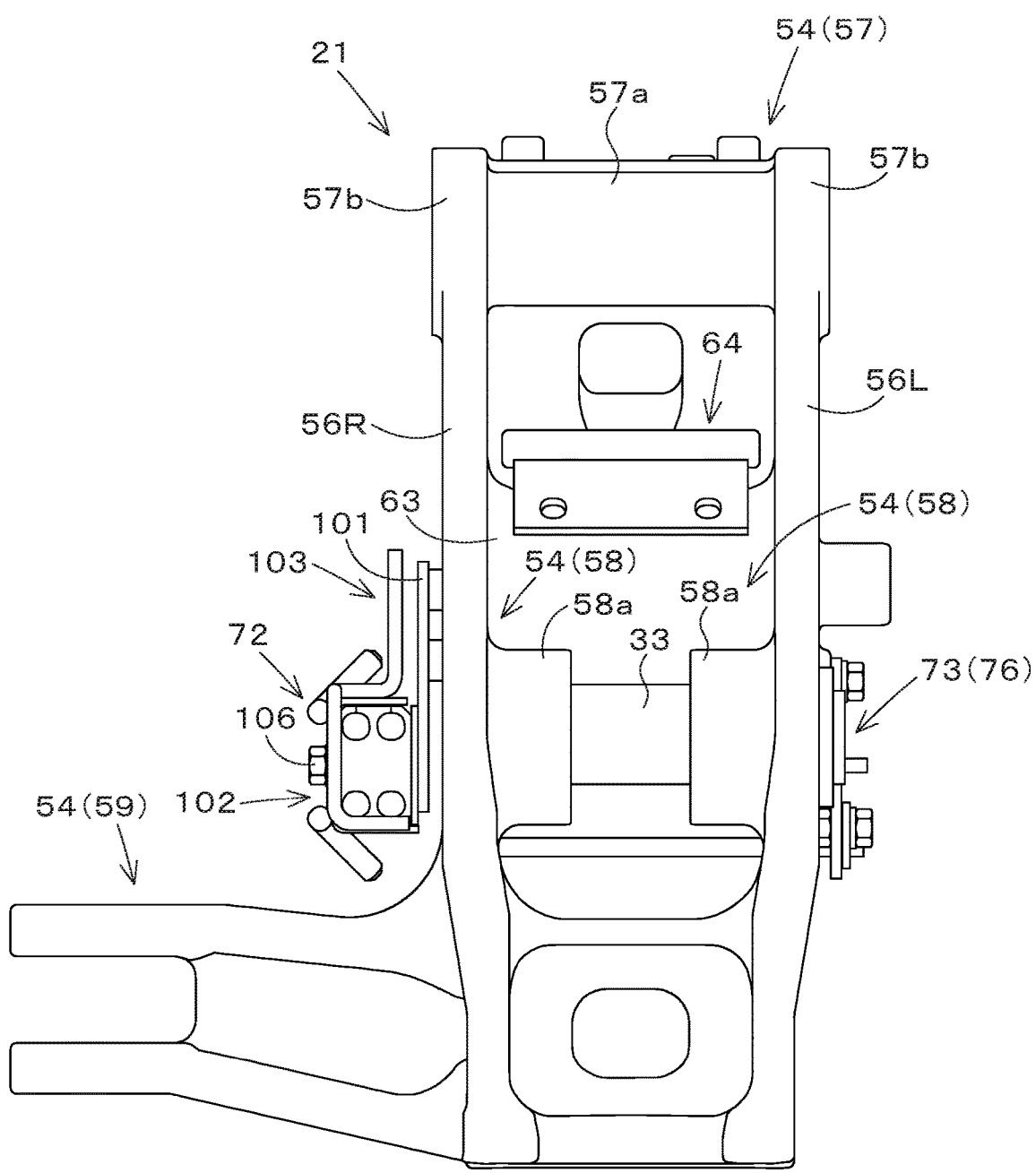
FIG. 2 is a front view of a swing bracket.

As illustrated in FIG. 2, the swing bracket 21 has one side wall 56L and another side wall 56R. In the present embodiment, the side wall 56L defines a left wall portion of the swing bracket 21, and the side wall 56R defines a right wall portion of the swing bracket 21.

Figure 3:
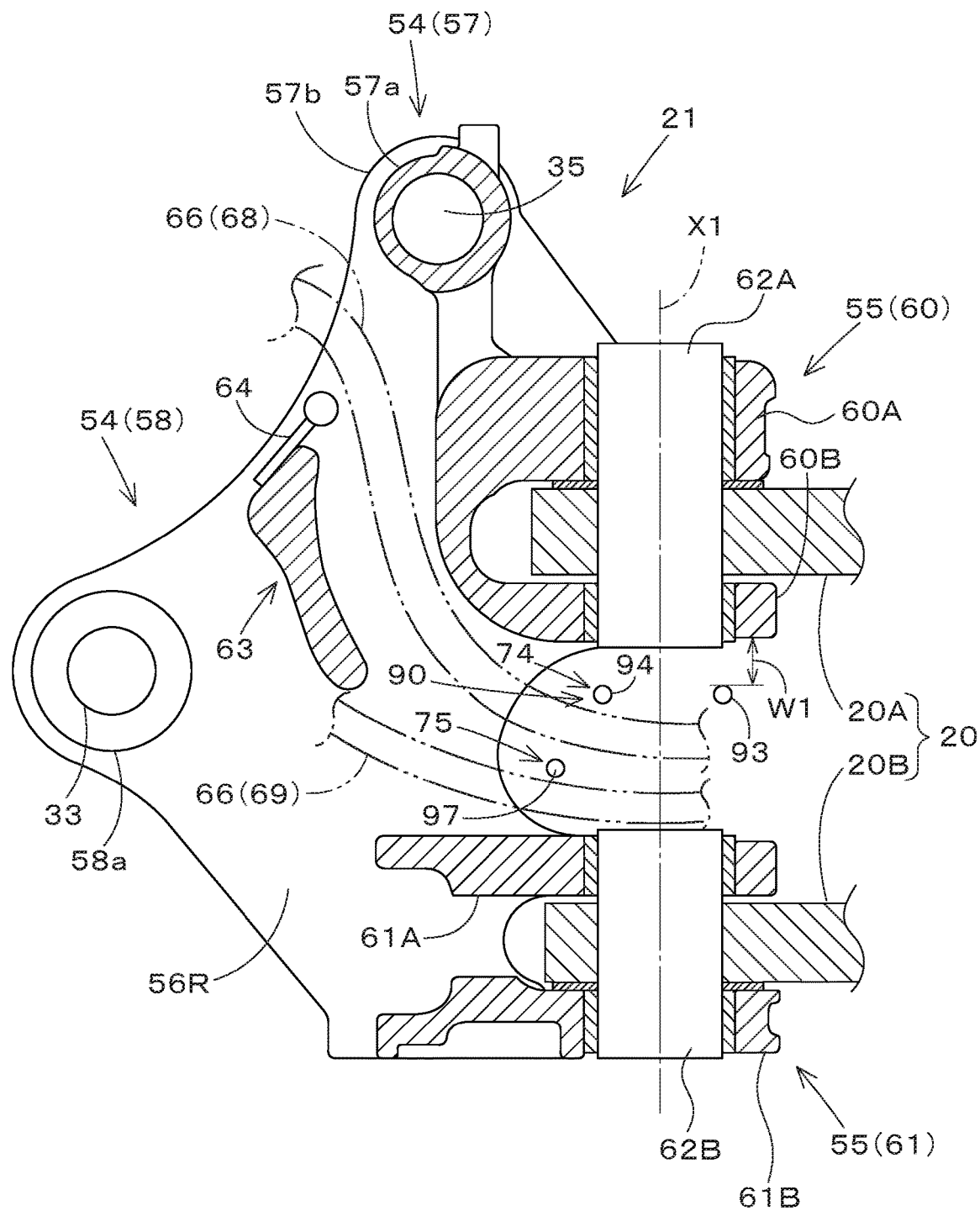
FIG. 3 is a side sectional view of the swing bracket.

As illustrated in FIG. 2 and FIG. 3, the swing bracket 21 has a plurality of cylinder attachment portions 54. The plurality of cylinder attachment portions 54 include a first cylinder attachment portion 57, a second cylinder attachment portion 58, and a third cylinder attachment portion 59.

An upper portion of the swing bracket 21 is provided with the first cylinder attachment portion 57 to pivotally support the base portion of the boom 31. Specifically, the first cylinder attachment portion 57 includes a pivotal support cylindrical portion 57*a* that couples the side wall 56L and the side wall 56R to each other, and cylinder bosses 57*b* provided on respective outer surfaces of the side walls 56L and 56R. The lateral axial shaft 35 to pivotably support the base portion of the boom 31 is inserted into the pivotal support cylindrical portion 57*a* and the cylinder bosses 57*b*.

A front portion of the swing bracket 21 is provided with the second cylinder attachment portion 58 to pivotally support the base end side (the bottom side of a cylinder tube of the hydraulic cylinder) of the boom cylinder 32. Specifically, the second cylinder attachment portion 58 defines vertically intermediate front portions of the side walls 56L and 56R. The second cylinder attachment portion 58 is provided with cylinder bosses 58*a* at the machine-body-width-directional inward portions thereof, and the base end portion of the boom cylinder 32 is pivotably supported via a pivot 33 passing through the cylinder bosses 58*a*.

The third cylinder attachment portion 59 projects outward in the machine-body-width-direction from a lower portion of the side wall 56R. Ahead portion of the swing cylinder (the head portion of a rod of the hydraulic cylinder) is attached to the third cylinder attachment portion 59.

As illustrated in FIG. 3, a plurality of pivotal support portions 55 are provided at the rear of the swing bracket 21. The plurality of pivotal support portions 55 include a first pivotal support portion 60 that is pivotably supported at the first bracket portion 20A via a pivot (upper swing shaft) 62A, and a second pivotal support portion 61 that is pivotably supported at the second bracket portion 20B via a pivot (lower swing shaft) 62B. The first pivotal support portion 60 and the second pivotal support portion 61 are provided between the side wall 56L and the side wall 56R and couple the side wall 56L and the side wall 56R to each other. The axes of the upper swing shaft 62A and the lower swing shaft 62B coincide with the swing axis X1.

The first pivotal support portion 60 has a bifurcated shape having an upper wall 60A disposed on the upper surface side of the first bracket portion 20A and a lower wall (first wall portion) 60B disposed on the lower surface side of the first bracket portion 20A. The upper swing shaft 62A passes through the upper wall 60A, the first bracket portion 20A, and the first wall portion 60B.

The second pivotal support portion 61 has a bifurcated shape having an upper wall (second wall portion) 61A disposed on the upper surface side of the second bracket portion 20B, and a lower wall 61B disposed on the lower surface side of the second bracket portion 20B. The lower swing shaft 62B passes through the second wall portion 61A, the second bracket portion 20B, and the lower wall 61B.

The first pivotal support portion 60 and the second pivotal support portion 61 are juxtaposed up and down with an interval therebetween. In other words, the first wall portion 60B and the second wall portion 61A face each other. Specifically, the first wall portion 60B and the second wall portion 61A face each other with an interval therebetween in the up-down direction.

As illustrated in FIG. 2 and FIG. 3, the swing bracket 21 includes a coupling wall 63 that couples the side wall 56L and the side wall 56R to each other. The coupling wall 63 is located on the front side of the first pivotal support portion 60 and the rear side of the second cylinder attachment portion. A hose guide 64 is attached to an upper portion of the coupling wall 63.

Figure 4:
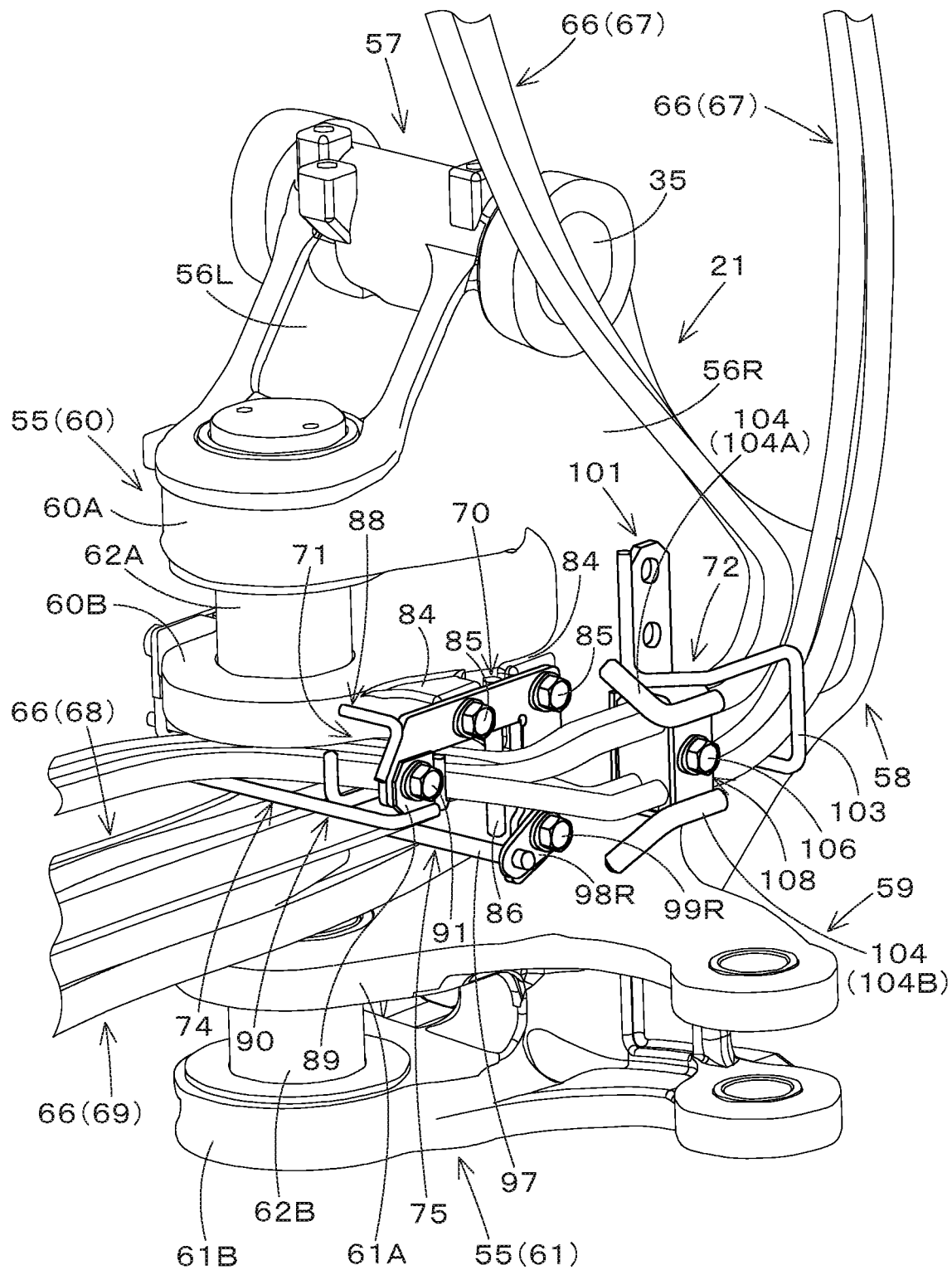
FIG. 4 is a perspective view of the swing bracket.

As illustrated in FIG. 4, a plurality of routing members 66 are routed on or along the swing bracket 21. Specifically, the plurality of routing members 66 are routed to the working device 4 from the machine body 2 through the swing bracket 21. In the present embodiment, the plurality of routing members 66 are hydraulic hoses. The plurality of routing members 66 include a plurality of first routing members 67, a plurality of second routing members 68, and a plurality of third routing members 69. The first routing members 67 are hydraulic hoses to supply and discharge a hydraulic fluid (pilot fluid) for pilot-operating a valve mounted on the working device 4. The second routing members 68 and the third routing members 69 are hydraulic hoses to supply and discharge a hydraulic fluid for a hydraulic attachment that is mounted instead of the hydraulic cylinders and the bucket 51 installed on the working device 4 or that is mounted together with the bucket 51.

The routing members are not limited to hydraulic hoses and may be, for example, a wire harness formed by bundled electric wires.

As illustrated in FIG. 4, a guide structure 70 to guide the plurality of routing members 66 is attached to the swing bracket 21.

Figure 5:
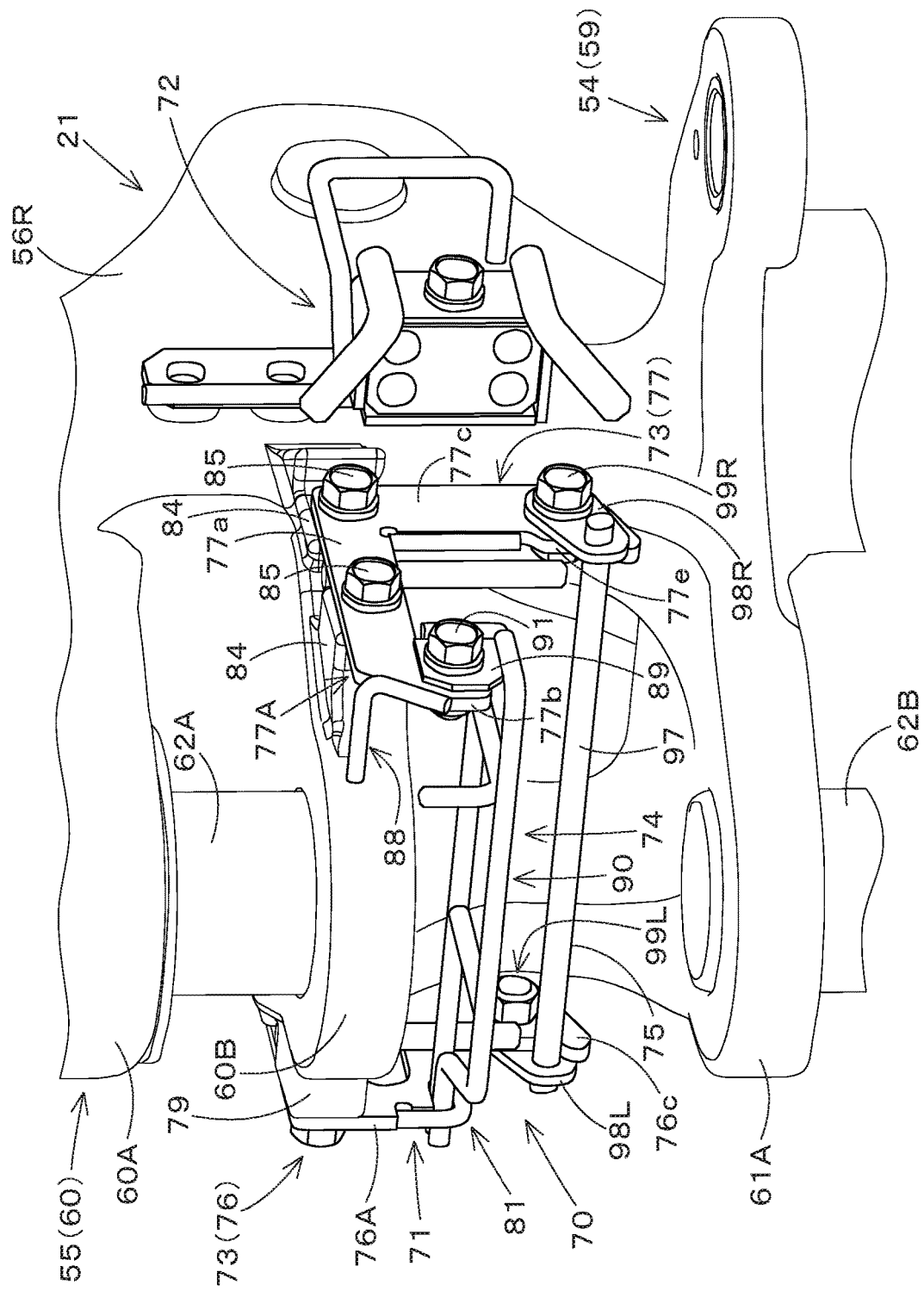
FIG. 5 is a perspective view illustrating an overall configuration of a guide structure.

As illustrated in FIG. 5, the guide structure 70 includes a first element 71 and a second element 72. The first element 71 includes an attachment body 73 that is attached to the swing bracket 21, and a first routing guide 74 and a second routing guide 75 that are attached to the attachment body 73. The attachment body 73 includes a first attachment member 76 that is attached to the one side surface (the left side surface) of the swing bracket 21, and a second attachment member 77 that is attached to the other side surface (the right side surface) of the swing bracket 21.

Figure 6:
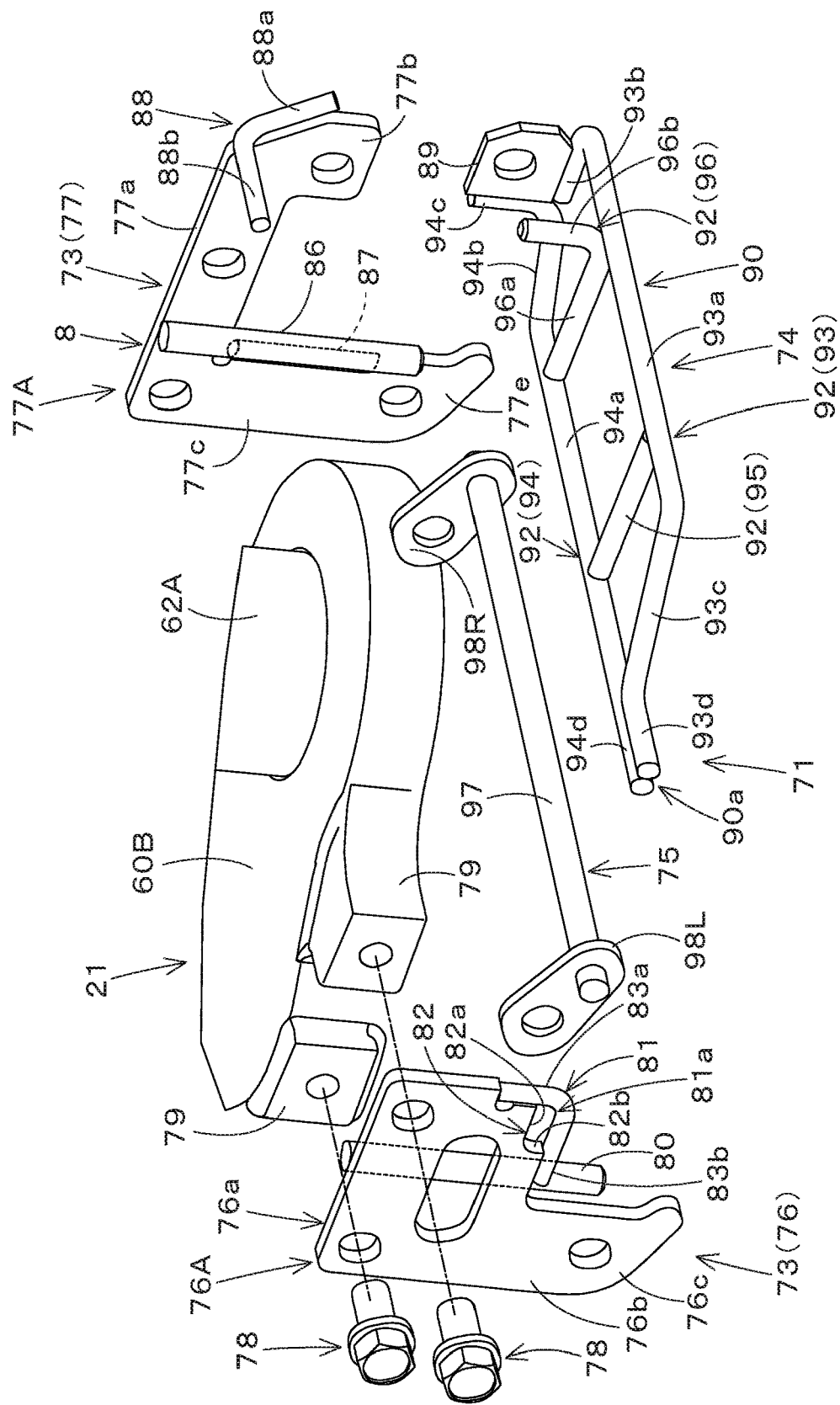
FIG. 6 is an exploded perspective view of a first structure.
Figure 8:
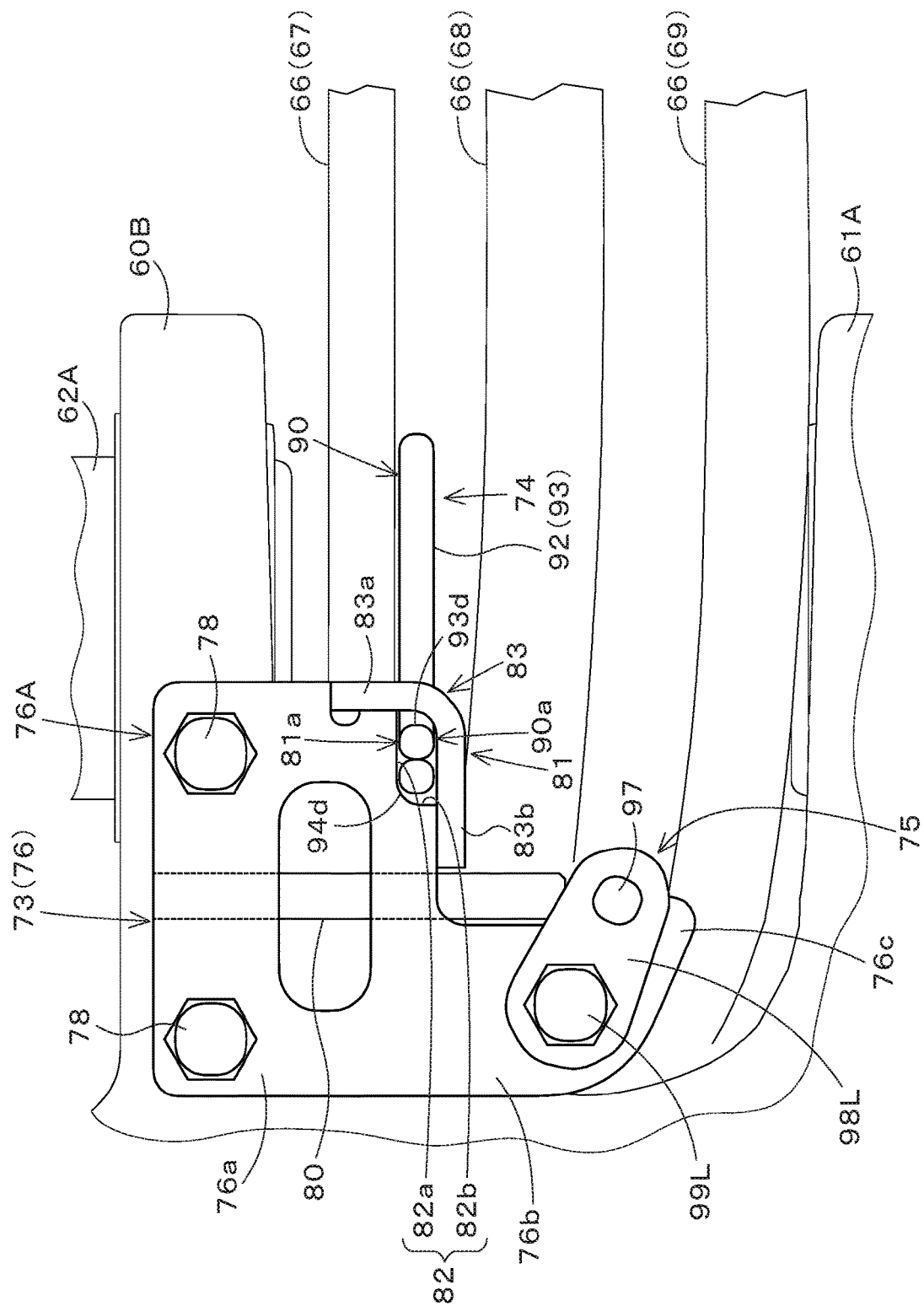
FIG. 8 is a right side view of the swing bracket and the guide structure.

As illustrated in FIG. 6 and FIG. 8, the first attachment member 76 includes a plate member 76A, which is a major component. The plate member 76A is disposed on the one side (left side) of the first wall portion 60B and formed of a plate having a plate surface directed in the machine-body width direction. The plate member 76A includes a first portion 76*a* and a second portion 76*b*. An upper portion of the first portion 76*a* is attached by a bolt 78 to an attachment portion 79 formed on the first wall portion 60B. The second portion 76*b* extends downward from a front portion of the first portion 76*a*. A lower portion of the second portion 76*b* defines an attachment portion 76*c* to which the second routing guide 75 is attached.

A rod member 80 is fixed to a surface of the first attachment member 76 facing inward in the machine-body-width-direction. The rod member 80 is formed of a bar (round bar) and disposed at an intermediate portion of the first attachment member 76 in the front-rear direction K1 and at the rear of the second portion 76*b*. The rod member 80 is fixed at an upper portion thereof to the first portion 76*a*, and projects at a lower portion thereof downward from the first portion 76*a*.

As illustrated in FIG. 6 and FIG. 8, the first attachment member 76 includes a support 81. The support 81 is provided at a rear and lower portion of the first portion 76*a*. The support 81 includes a notch 82 that is formed in the first portion 76*a*, and a support rod 83 that is fixed to the first portion 76*a*. The notch 82 is formed to have an upper edge 82*a* and a front edge 82*b* in a shape that opens rearward and downward. The support rod 83 includes a vertical rod portion 83*a* extending in the up-down direction and a lateral rod portion 83b extending forward from the lower end of the vertical rod portion 83a. The vertical rod portion 83a is disposed at the rear of the notch 82, and has an upper portion that is fixed to the first portion 76a and a lower portion that closes the rear open end of the notch 82. A front portion of the lateral rod portion 83b is fixed to the first portion 76a. A rear portion of the lateral rod portion 83b closes a lower open end of the notch 82. The support 81 has an insertion area (hole) 81a that is surrounded by the upper edge 82a, the front edge 82b, the vertical rod portion 83a, and the lateral rod portion 83b.

Figure 7:
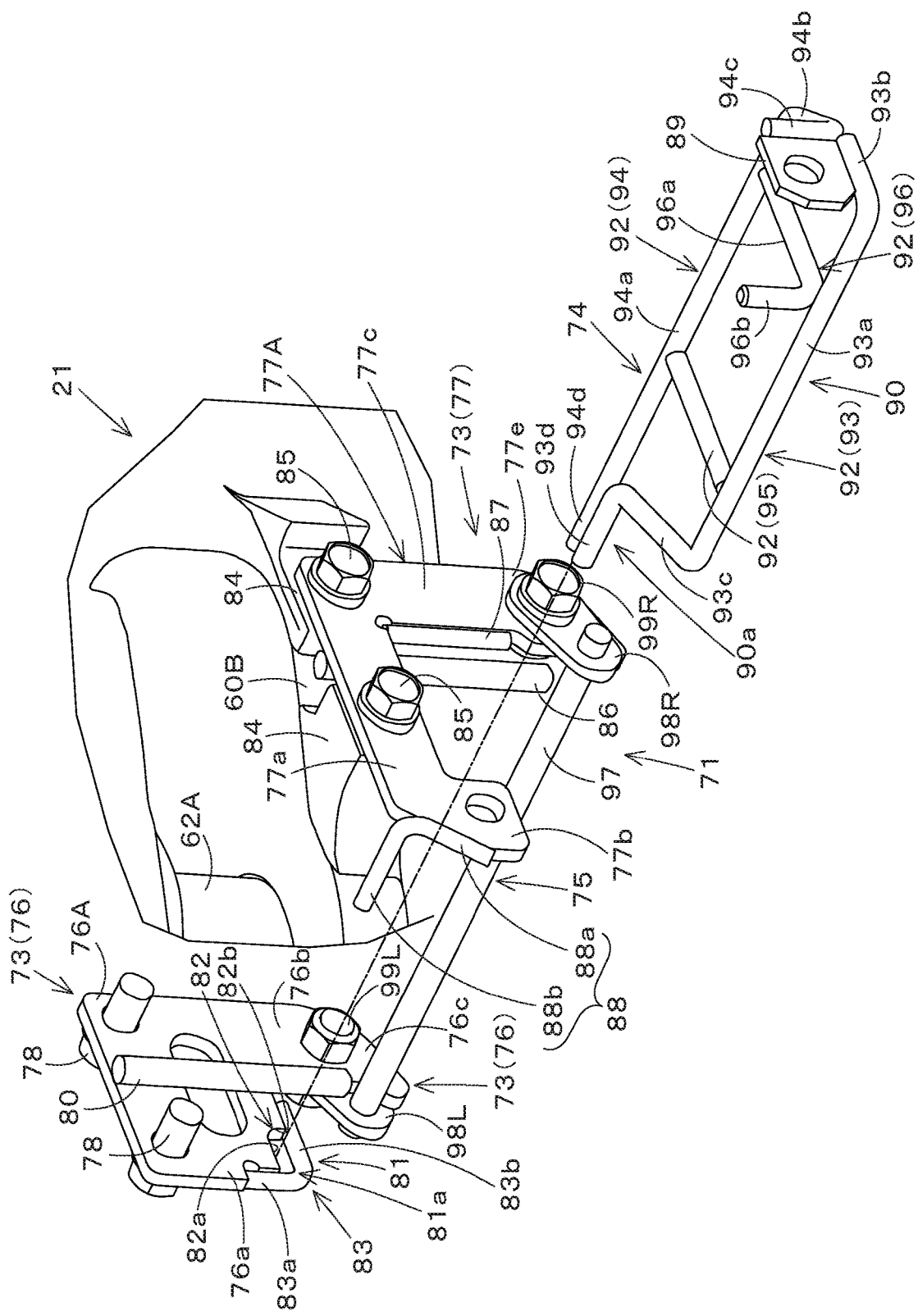
FIG. 7 is a perspective view describing assembly of a guide member.

As illustrated in FIG. 5 and FIG. 7, the second attachment member 77 includes a plate member 77A, which is a major component. The plate member 77A is disposed on the other side (right side) of the first wall portion 60B and formed of a plate having a plate surface directed in the machine-body width direction. The plate member 77A includes a first portion 77a, a second portion 77b, and a third portion 77c. The first portion 77a is extended in the front-rear direction K1 and is fixed by a bolt 85 to an attachment portion 84 provided at the first wall portion 60B. The second portion 77b extends downward from a rear portion of the first portion 77a. The second portion 77b is an attachment portion to which the first routing guide 74 is attached. The third portion 77c extends downward from a front portion of the first portion 77a. A lower portion of the third portion 77c extends downward further than the second portion 77b. A lower portion of the third portion 77c defines an attachment portion 77e to which the second routing guide 75 is attached.

As illustrated in FIG. 6, the second attachment member 77 includes a guide rod 86 and a protection rod 87. The guide rod 86 and the protection rod 87 are each formed of a bar (round bar). The guide rod 86 guides the routing members 66 (first routing members 67). The protection rod 87 prevents the routing members 66 (first routing members 67) from contacting the edge of the plate member 77A. The guide rod 86 is extended in the up-down direction and fixed at an upper portion thereof to a surface of a front portion of the first portion 77a facing inward in the machine-body-width-direction. The guide rod 86 projects downward from the first portion 77a. A lower portion of the guide rod 86 extends to a lower portion of the third portion 77c. The protection rod 87 is disposed on the front side of and substantially parallel to the guide rod 86 and is fixed to the rear end of the third portion 77c.

As illustrated in FIG. 6 and FIG. 7, a guide rod 88 is fixed to the second attachment member 77. The guide rod 88 is formed of a bar (round bar) and is capable of guiding, for example, a wire harness. The guide rod 88 has a base portion 88a fixed to the second portion 77b, and a guide portion 88b extending inward in the machine-body-width-direction from the upper end of the base portion 88a.

As illustrated in FIG. 6 and FIG. 7, the first routing guide 74 has a first guide member (guide member) 90 formed of a plurality of rod members 92, and an attachment stay 89 that is formed of a plate having a plate surface facing in the machine-body width direction and that is fixed to a right side portion of the first guide member 90.

As illustrated in FIG. 5, the first guide member 90 is disposed closer to the first wall portion 60B between the first wall portion 60B and the second wall portion 61A.

As illustrated in FIG. 6 and FIG. 7, the plurality of rod members 92 defining the first guide member 90 are each formed of a bar (round bar). The plurality of rod members 92 include a first rod member 93, a second rod member 94, a third rod member 95, and a fourth rod member 96.

The first rod member 93 includes a first portion 93a, a second portion 93b, a third portion 93c, and a fourth portion 93d. The first portion 93a is extended in the machine-body width direction. The second portion 93b extends forward from a right end portion of the first portion 93a and is fixed to the lower end of the attachment stay 89. The third portion 93c extends forwardly leftward slantwise from a left end portion of the first portion 93a. The fourth portion 93d extends leftward from a left end portion of the third portion 93c and extends in the machine-body width direction.

The second rod member 94 includes a first portion 94a, a second portion 94b, a third portion 94c, and a fourth portion 94d. The first portion 94a is extended in the machine-body width direction and is disposed at the front of and parallel to the first portion 93a of the first rod member 93. The second portion 94b extends rearwardly rightward slantwise from a right end portion of the first portion 94a. The third portion 94c extends upward from a rear end portion of the second portion 94b and is fixed to the front end of the attachment stay 89. The fourth portion 94d extends leftward from the left end of the first portion 94a linearly and is fixed to the fourth portion 93d of the first rod member 93 so as to overlap the first rod member 93. The fourth portion 93d of the first rod member 93 and the fourth portion 94d of the second rod member 94 are insertable into the insertion area 81a of the support 81. In other words, the fourth portion 93d and the fourth portion 94d define an inserted portion 90a to be inserted into the insertion area 81a of the support 81.

As illustrated in FIG. 6 and FIG. 7, the third rod member 95 is disposed leftward between the first portion 93a of the first rod member 93 and the first portion 94a of the second rod member 94 and couples the first portion 93a and the first portion 94a to each other.

The fourth rod member 96 includes a first portion 96a and a second portion 96b. The first portion 96a is disposed rightward between the first portion 93a of the first rod member 93 and the first portion 94a of the second rod member 94 and couples the first portion 93a and the first portion 94a to each other. The second portion 96b extends upward from a rear end portion of the first portion 96a.

As illustrated in FIG. 5, the attachment stay 89 is attached to the second portion 77b of the second attachment member 77. Specifically, the attachment stay 89 is placed so as to overlap a surface of the second portion 77b facing outward in the machine-body-width-direction and is attached and fixed to the second portion 77b by a fastener 91 defined by a bolt and a nut screwed on the bolt.

The first routing guide 74 is attached as described below.

As illustrated in FIG. 7, the first routing guide 74 (first guide member 90) is placed rightward of the attachment body 73 (second attachment member 77) having been attached to the swing bracket 21, and the first routing guide 74 is moved leftward with respect to the attachment body 73. Then, the inserted portion 90a is inserted into the insertion area 81a of the support 81, and the attachment stay 89 is attached to the second portion 77b of the second attachment member 77. Consequently, as illustrated in FIG. 5, one side portion of the first routing guide 74 is inserted into the support 81 of the first attachment member 76 and supported by the support 81, and the other side portion of the first routing guide 74 is fixed to the second portion (attachment portion) 77b of the second attachment member 77 by the fastener 91.

As described above, the first routing guide 74 can be inserted from a side of the attachment body 73 attached to the swing bracket 21 into a space between the first routing members 67 and the second routing members 68 that have been routed along the swing bracket 21, thereby being attached to the attachment stay 73

The first routing guide 74 can be variously changed in design as long as the first routing guide 74 has a structure to be attached to the attachment body 73 after the first guide member 90 is inserted into the space between the first routing members 67 and the second routing members 68 having been routed. For example, instead of the inserted portion 90a, an attachment stay may be provided on the one side end portion of the first guide member 90 and may be attached to the first attachment member 76 by a fastener such as a bolt and a nut or the like.

In the aforementioned configuration, the first guide member 90 is inserted at one end portion thereof into the insertion area (hole) 81a provided in the first attachment member 76 attached to one side surface of the swing bracket 21 and supported at the one end portion thereof in the insertion area 81a, and is fixed at the other end portion thereof by the fastener 91 to the second attachment member 77 attached to the other side surface of the swing bracket 21. The structure is, however, not limited thereto. The first guide member 90 may be inserted at one end portion thereof into a hole formed directly on the one side surface of the swing bracket 21 (directly on the swing bracket 21) and supported at the one end portion thereof in the hole and may be fixed at the other end portion thereof by the fastener 91 directly to the other side surface of the swing bracket 21.

Next, the second routing guide 75 will be described.

As illustrated in FIG. 7, the second routing guide 75 includes a second guide member (another guide member) 97, a first stay 98L that is fixed to one side end (left side end) of the second guide member 97, and a second stay 98R that is fixed to the other side end (right side end) of the second guide member 97.

Figure 12:
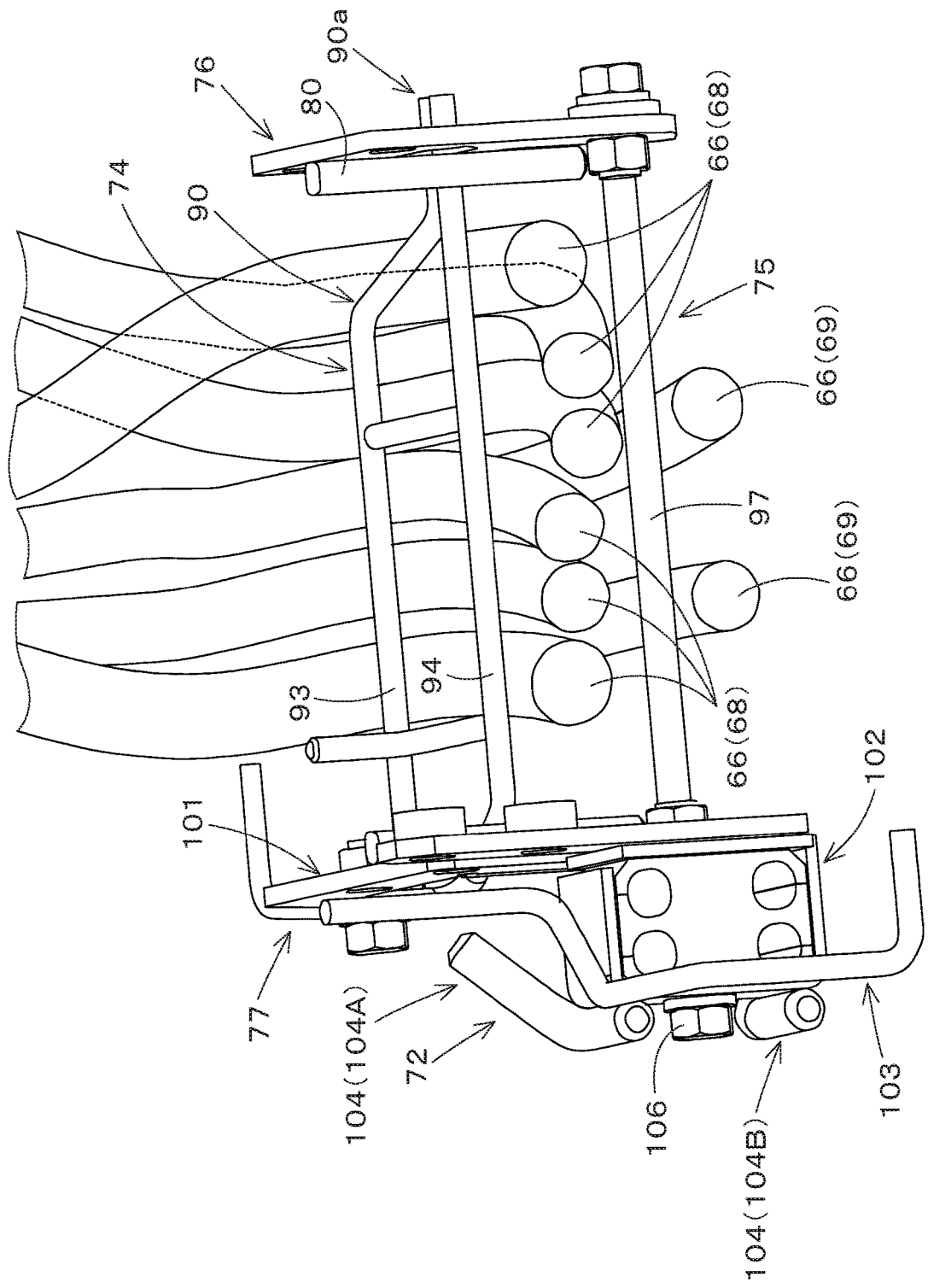
FIG. 12 is a perspective view illustrating an arrangement of a second routing member and a third routing member.

As illustrated in FIG. 5 and FIG. 7, the second guide member 97 is formed of a bar (round bar) and is disposed below the first guide member 90 to extend in the machine-body width direction. In other words, as illustrated in FIG. 12, the second guide member 97 is extended in a direction intersecting the extending direction of each second routing member 68.

As illustrated in FIG. 3, the second guide member 97 is disposed closer to the second wall portion 61A between the first wall portion 60B and the second wall portion 61A. In addition, the second guide member 97 is offset from the first guide member 90 in the extending direction of each second routing member 68. Specifically, the second guide member 97 is disposed forward (in a direction crossing the second routing members 68 and orthogonal to the direction in which the first wall portion 60B and the second wall portion 61A face each other) of the first guide member 90.

As illustrated in FIG. 5 and FIG. 7, the first stay 98L is disposed on the machine-body-width-directional outward side (left side) of the attachment portion 76c of the first attachment member 76, and is attached at a front portion thereof to the attachment portion 76c by a bolt 99L and a nut screwed on the bolt 99L. A left end portion of the second guide member 97 is fixed to a rear portion of the first stay 98L.

The second stay 98R is disposed on the machine-body-width-directional outward side (right side) of the attachment portion 77e of the second attachment member 77, and is fixed at a front portion thereof to the attachment portion 77e by a bolt 99R and a nut screwed on the bolt 99R. A right end portion of the second guide member 97 is fixed to a rear portion of the second stay 98R.

Next, the second element 72 will be described.

Figure 9:
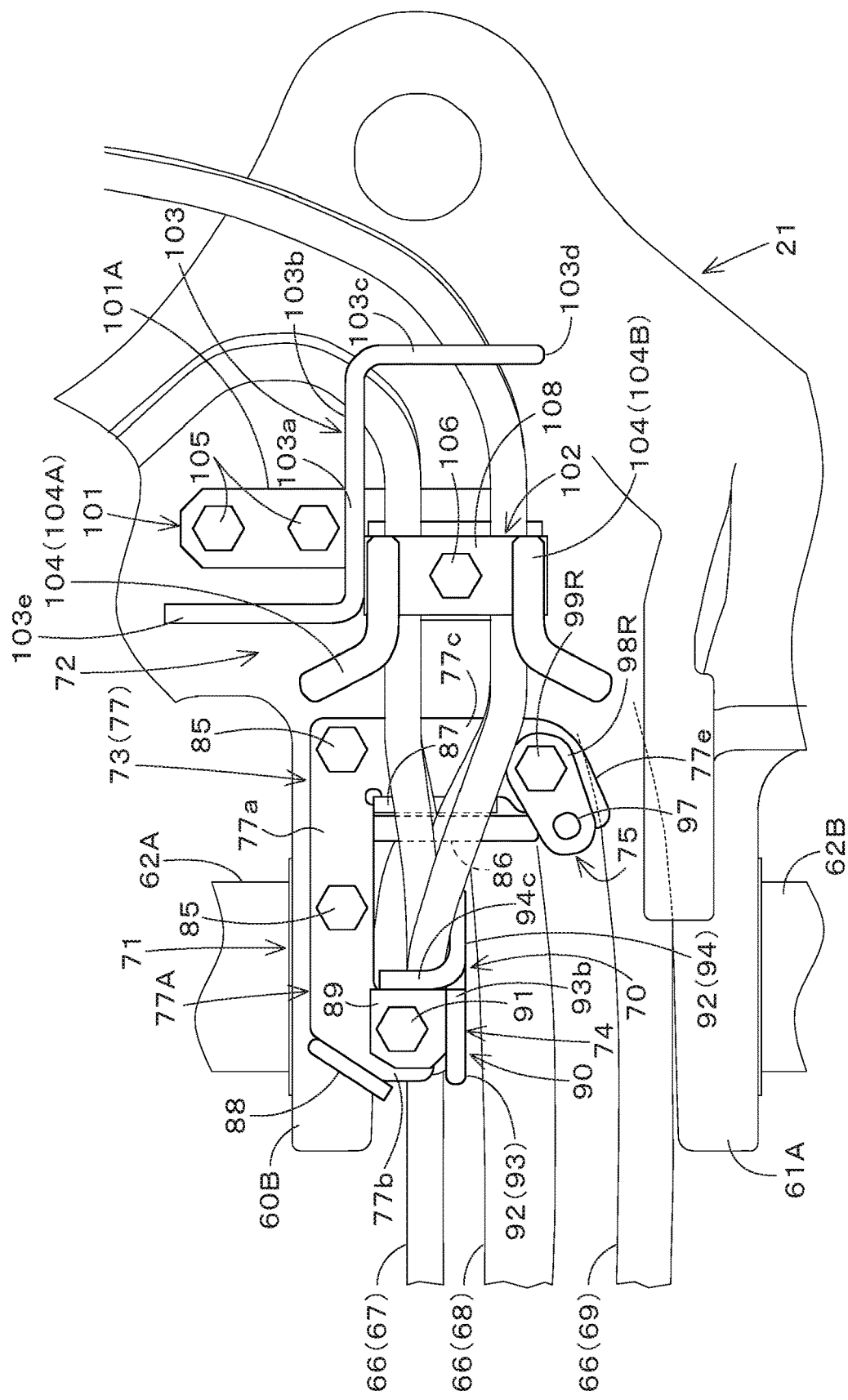
FIG. 9 is a left side view of the swing bracket and the guide structure.

As illustrated in FIG. 9, the second element 72 is provided on the right side surface side of the swing bracket 21. In addition, the second element 72 is disposed at the front of the second attachment member 77.

The second element 72 may be provided on the left side surface side of the swing bracket 21. In this case, the second attachment member 77 is provided on the left side surface side of the swing bracket 21, and the first attachment member 76 is provided on the right side surface side of the swing bracket 21.

The second element 72 includes an attachment stay 101, a clamp member 102, a guide rod 103, and a plurality of rod members 104.

Figure 10:
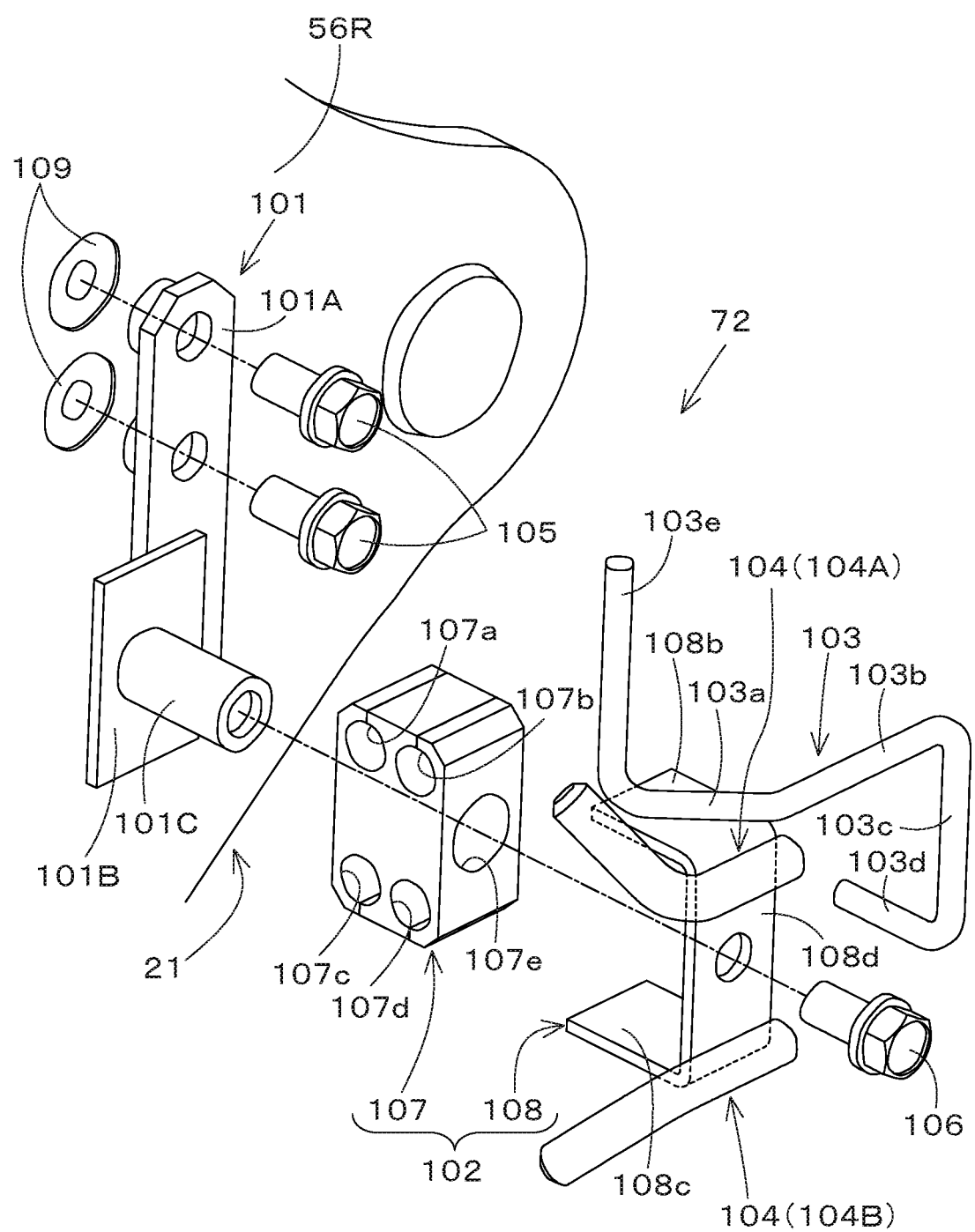
FIG. 10 is an exploded perspective view of a second structure.

As illustrated in FIG. 10, the attachment stay 101 includes a first plate 101a, a second plate 101b, and a cylindrical portion 101c. The first plate 101a is formed of a plate elongated in the up-down direction, and is attached at an upper portion thereof by bolts 105 to attachment portions 109 provided on the side wall 56R of the swing bracket 21. The second plate 101b is fixed to a lower portion of the first plate 101a. The cylindrical portion 101c is formed of a cylinder body having an axis extending in the machine-body width direction and is fixed to the second plate 101b to have a shape projecting rightward.

The clamp member 102 includes a clamp body 107 and a holding member 108. The clamp body 107 is formed of an elastic member, such as rubber, to have a rectangular block shape. The clamp body 107 includes a plurality of insertion holes (a first insertion hole 107a to a fourth insertion hole 107d) and a through hole 107e. The first insertion hole 107a to the fourth insertion hole 107d are holes through which the routing members 66 (first routing members 67) pass and are formed to pass through the clamp body 107 in the front-rear direction K1. The first insertion hole 107a and the second insertion hole 107b are juxtaposed in the machine-body width direction in an upper portion of the clamp body 107. The third insertion hole 107c and the fourth insertion hole 107d are juxtaposed in the machine-body width direction in a lower portion of the clamp body 107. The clamp body 107 has a slit extending from the outer surface of the clamp body 107 to the first insertion hole 107a to the fourth insertion hole 107d to enable the routing members 66 to be inserted into the first insertion hole 107a to the fourth insertion hole 107d via the slit. In the machine-body width direction, the through hole 107e is formed to pass through an intermediate portion in the up-down direction of the clamp body 107. The cylindrical portion 101c is insertable into the through hole 107e.

The holding member 108 includes a side wall portion 108a, an upper wall portion 108b extending inward in the machine-body-width-direction (leftward) from an upper end portion of the side wall portion 108a, and a lower wall portion 108c extending inward in the machine-body-width-direction from a lower end portion of the side wall portion 108a. The holding member 108 is attached to the attachment stay 101 by a bolt 106 that is fitted to the outer side of the clamp body 107 and that passes through the side wall portion 108a to be screwed on the cylindrical portion 101c. Consequently, the holding member 108 holds the clamp body 107.

The guide rod 103 is formed of a bar (round bar) and includes a first portion 103a to a fifth portion 103e. The first portion 103a extends forwardly rightward slantwise, and is fixed to the upper wall portion 108b of the holding member 108. The second portion 103b extends forward from a front end portion of the first portion 103a. The third portion 103c extends downward from a front end portion of the second portion 103b. The fourth portion 103d extends leftward from a lower end portion of the third portion 103c. The fifth portion 103e extends upward from a rear end portion of the first portion 103a.

The plurality of rod members 104 include an upper rod member 104A fixed to an upper portion of the side wall portion 108a of the holding member 108, and a lower rod member 104B fixed to a lower portion of the side wall portion 108a. A front portion of the upper rod member 104A is fixed to an upper portion of the side wall portion 108a. A rear portion of the upper rod member 104A extends upwardly and rearwardly leftward slantwise. A front portion of the lower rod member 104B is fixed to a lower portion of the side wall portion 108a. A rear portion of the lower rod member 104B extends downwardly and rearwardly leftward slantwise.

Figure 11:
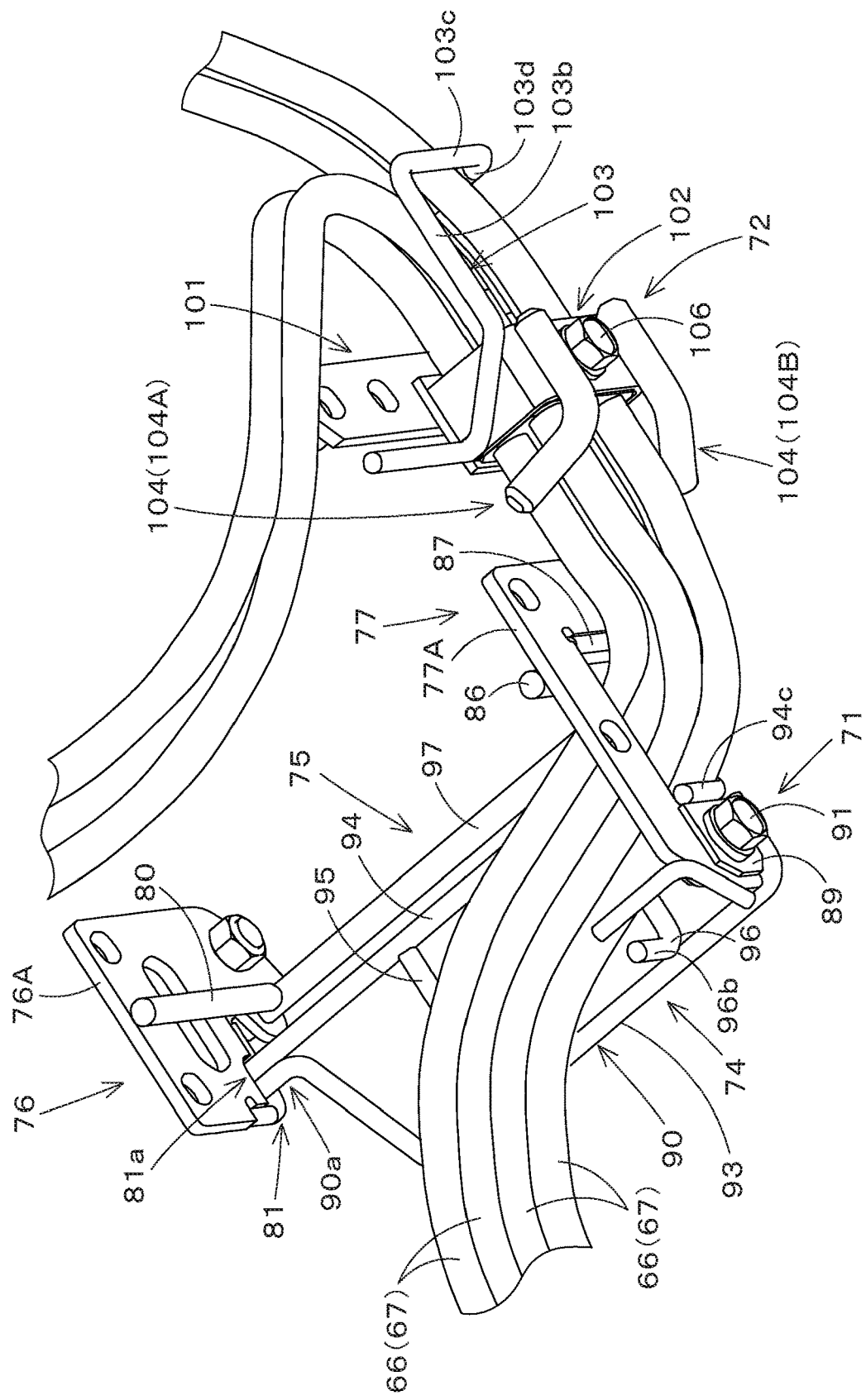
FIG. 11 is a perspective view illustrating an arrangement of a first routing member.

As illustrated in FIG. 11, the number of the plurality of first routing members 67 is four in the present embodiment. The four first routing members 67 are routed, between the first wall portion 60B and the first guide member 90, side by side in the width direction (the radial direction of hydraulic hoses) of each first routing member 67. From between the first wall portion 60B and the first guide member 90, the four first routing members 67 pass between the guide rod 86 and the third portion 94c of the second rod member 94 to be routed at the right of the swing bracket 21 and clamped by the clamp member 102. The two first routing members 67 clamped by an upper portion of the clamp member 102 pass on the left side of the second portion 103b of the guide rod 103 to be connected to a hydraulic pipe line to supply and discharge a hydraulic fluid to and from a valve that is attached to the arm cylinder 42. The two first routing members 67 clamped by a lower portion of the clamp member 102 pass on the left side of the third portion 103c of the guide rod 103 and above the fourth portion 103d to be connected to a valve that is attached to the boom cylinder 32.

As illustrated in FIG. 12, the number of the plurality of second routing members 68 is six. Two of the six second routing members 68 are hydraulic hoses to supply and discharge a hydraulic fluid to and from the arm cylinder 42, the other two thereof are hydraulic hoses to supply and discharge a hydraulic fluid to and from the bucket cylinder 52, and the remaining two thereof are hydraulic hoses to supply and discharge a hydraulic fluid to and from the hydraulic attachment. The second guide member 97 is disposed across the six second routing members 68. The six second routing members 68 pass between the first guide member 90 and the second guide member 97 to be routed. As illustrated in FIG. 3, after passing between the first guide member 90 and the second guide member 97, the six second routing members 68 pass between the coupling wall 63 and the first pivotal support portion 60 to be routed forwardly upward of the swing bracket 21.

As illustrated in FIG. 12, the number of the plurality of third routing members 69 is two. The two third routing members 69 are hydraulic hoses to supply and discharge a hydraulic fluid to and from the boom cylinder 32. As illustrated in FIG. 3, the two third routing members 69 are routed between the second guide member 97 and the second wall portion 61A and pass between the coupling wall 63 and the pivot 33 from between the second guide member 97 and the second wall portion 61A to be routed forward of the swing bracket 21.

Figure 13:
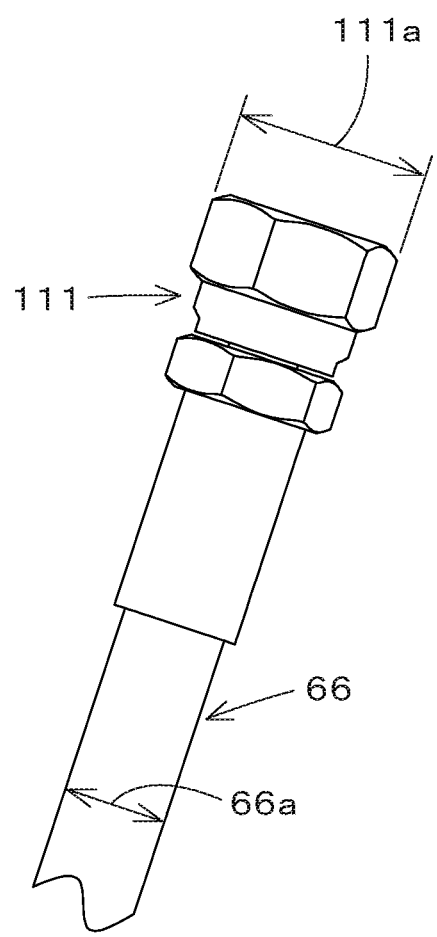
FIG. 13 is a view illustrating an end portion of a routing member.

As illustrated in FIG. 13, an end portion of each routing member 66 (hydraulic hose) is provided with a metal fitting (joint) 111 that connects the routing member 66 to another member (a valve, a steel pipe, a hydraulic hose, a hydraulic cylinder, or the like). A width (the width of the metal fitting 111 in a direction orthogonal to the extending direction of each routing member 66) 111a of the metal fitting 111 is larger than a width (the diameter of the hydraulic hose) 66a of each routing member 66.

When, in addition to the second routing members 68 and the third routing members 69 to supply and discharge a hydraulic fluid to and from the arm cylinder 42, the bucket cylinder 52, the hydraulic attachment, and the boom cylinder 32, the first routing members 67 for pilot are routed between the first wall portion 60B and the second wall portion 61A, routing of the routing members 66 may be difficult.

For example, when the routing members 66 are to be routed after the first guide member 90 and the second guide member 97 are attached to the swing bracket 21, the interval between the first wall portion 60B and the first guide member 90, the interval between the first guide member 90 and the second guide member 97, and the interval between the second guide member 97 and the second wall portion 61A are required to have sizes that allow the metal fitting 111 to pass therethrough. However, if the interval between the first wall portion 60B and the second wall portion 61A is insufficient, there is a likelihood that an interval sufficient to allow the metal fitting 111 to pass therethrough is not formed between the first wall portion 60B and the second wall portion 61A.

In the present embodiment, it is possible to attach the first guide member 90 (first routing guide 74) to the attachment body 73 by inserting the first guide member 90 into the space between the first wall portion 60B and the second wall portion 61A from the side of the swing bracket 21. That is, the first guide member 90 (first routing guide 74) can be assembled to the swing bracket 21 by being inserted into the space between the first wall portion 60B and the second wall portion 61A in a direction intersecting the extending direction of each first routing member 67 after the routing members 66 are routed. Specifically, it is possible to route the first routing members 67 and the second routing members 68 above the second guide member 97 and route the third routing members 69 below the second guide member 97 before assembling the first guide member 90 (first routing guide 74) and, in this state, assemble the first guide member 90 to the attachment body 73 by inserting the first guide member 90 into the space between the first routing members 67 and the second routing members 68. Consequently, an interval W1, illustrated in FIG. 3, between the first wall portion 60B and the first guide member 90 can be more than or equal to the width of each first routing member 67 and less than or equal to the width 111a of the metal fitting 111 (to be narrower than the width 111a of the metal fitting 111). Therefore, it is possible in the present embodiment to place a larger number of the routing members 66 compared with the related art in the same space (between the first wall portion 60B and the second wall portion 61A).

The first guide member 90 may include another rod member that is disposed between the first and second rod members 93 and 94 and the first wall portion 60B. In this case, the interval between the first and second rod members 93 and 94 and the other rod member can be more than or equal to the width of each first routing member 67 and less than or equal to the width of the metal fitting 111. That is, it is sufficient that the interval between the first and second rod members 93 and 94 and the member that is present above the first and second rod members 93 and 94 defines a gap through which the first routing members 67 can pass.

In addition, since the first guide member 90 (first routing guide 74) can be assembled after the routing members 66 are disposed, it is possible to dispose the first routing members 67 and the second routing members 68 easily between the first wall portion 60B and the second guide member 97.

Moreover, since the first routing guide 74 can be attached to the second portion 77b by the single bolt defining the fastener 91 with the inserted portion 90a inserted into the support 81 (insertion area 81a), attaching the first routing guide 74 can be easily performed from the side of one side of the swing bracket 21.

Further, since the second guide member 97 is offset forward from the first guide member 90 as illustrated in FIG. 3, the interval between the first guide member 90 (second rod member 94) and the second guide member 97 can be increased.

The routing-member guide structure in the present embodiment includes a movable member (swing bracket 21) pivotably supported by the fixed-side member (support bracket 20); the first routing members 67 routed on or along the movable member 21; and the guide member (first guide member 90) to guide the first routing members 67. The movable member 21 includes the first wall portion 60B and the second wall portion 61A facing each other with an interval therebetween. The first guide member 90 is inserted into a space between the first wall portion 60B and the second wall portion 61A in a direction intersecting the extending direction of each first routing member 67 having been routed between the first wall portion 60B and the second wall portion 61A, and is fixed to the movable member 21, thereby guiding the first routing members 67 between the first wall portion 60B and the first guide member 90.

According to this configuration, the first guide member 90 can be assembled to the movable member 21 after the first routing members 67 are routed. Consequently, it is possible to improve assembling properties of the first routing members 67.

One end portion of the first guide member 90 is inserted into the hole (insertion area 81a) provided on one side surface of the movable member 21 or on the first attachment member 76 attached to the one side surface of the movable member 21 and supported in the hole, and the other end portion of the first guide member 90 is fixed by the fastener 91 to the other side surface of the movable member 21 or to the second attachment member 77 attached to the other side surface of the movable member 21.

According to this configuration, it is possible to perform assembling of the first guide member 90 easily.

The end portion of each first routing member 67 is provided with the joint (metal fitting 111) that connects the first routing member 67 to another member, and the interval W1 between the first wall portion 60B and the first guide member 90 is narrower than the width 111a of the joint 111 in the direction orthogonal to the extending direction of each first routing member 67.

The first guide member 90 can be assembled to the movable member 21 even after the first routing members 67 are routed. It is thus possible to assemble the first guide member 90 and the first routing members 67 even when the interval W1 between the first wall portion 60B and the first guide member 90 is narrower than the width 111a of the joint 111.

In addition, the second routing members 68 are routed between the first routing members 67 and the second wall portion 61A. In the state in which the first routing members 67 and the second routing members 68 have been routed between the first wall portion 60B and the second wall portion 61A, the first guide member 90 is inserted into the space between the first routing members 67 and the second routing members.

According to this configuration, it is possible to improve assembling properties of the first routing members 67 and the second routing members.

The first guide member 90 is disposed closer to the first wall portion 60B between the first wall portion 60B and the second wall portion 61A and the other guide member (second guide member 97) is disposed closer to the second wall portion 61A between the first wall portion 60B and the second wall portion 61A. The first routing members 67 are routed between the first wall portion 60B and the first guide member 90, the second routing members 68 are routed between the first guide member 90 and the second guide member 97, and the third routing members 69 are routed between the second guide member 97 and the second wall portion 61A.

According to this configuration, it is possible to place a larger number of the routing members 66 between the first wall portion 60B and the second wall portion 61A compared with the related art.

The second guide member 97 is extended in a direction intersecting the extending direction of each second routing member 68 and is offset from the first guide member 90 in the extending direction of each second routing member 68.

According to this configuration, it is possible to increase the interval between the first guide member 90 and the second guide member 97.

The first routing members 67 are routed on the one side surface side or the other side surface side of the movable member 21 from between the first wall portion 60B and the second wall portion 61A and the clamp member 102 clamps the first routing members 67 routed on the one side surface side or the other side surface side of the movable member 21.

According to this configuration, the first guide member 90 can be inserted into the space between the first routing members 67 and the second routing members 68 in a state in which the first routing members 67 are clamped by the clamp member 102, and it is possible to provide a routing-member guide structure excellent in assembling properties of the first guide member 90.

The working machine 1 in the present embodiment includes the machine body 2; the aforementioned routing-member guide structure; the support bracket 20, which is the fixed-side member provided at the machine body 2; and, at the support bracket 20, the swing bracket 21, which is a movable member supported to be rotatable around the pivots 62A and 62B each having an axis extending in the up-down direction.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A routing-member guide structure comprising:
   a movable member pivotably supported by a fixed-side member;
   a first routing member routed on or along the movable member; and
   a guide member to guide the first routing member, wherein:
   the movable member includes one side wall and another side wall provided at an interval from each other in a lateral direction and a first wall portion and a second wall portion facing each other with an interval therebetween in an up-down direction, the first wall portion and the second wall portion being provided between and connected to the one side wall and the other side wall; and the guide member is inserted, in the lateral direction which is a direction intersecting an extending direction of the first routing member having been routed between the first wall portion and the second wall portion, into a space between the first routing member first wall portion and the second wall portion and is fixed to the movable member so as to guide the first routing member between the first wall portion and the guide member.

2. The routing-member guide structure according to claim 1, wherein the guide member is inserted at one end portion thereof into a hole on one side surface of the movable member or on a first attachment member attached to the one side surface of the movable member and supported at the one end portion thereof in the hole, and is fixed at another end portion thereof by a fastener to another side surface of the movable member or to a second attachment member attached to the other side surface of the movable member.

3. The routing-member guide structure according to claim 1, wherein:
   an end portion of the first routing member is provided with a joint to connect the first routing member to another member; and
   an interval between the first wall portion and the guide member is narrower than a width of the joint in a direction orthogonal to the extending direction of the first routing member.

4. The routing-member guide structure according to claim 1, comprising:
   a second routing member routed between the first routing member and the second wall portion, wherein
   the guide member is inserted into a space between the first routing member and the second routing member that have been routed between the first wall portion and the second wall portion.

5. The routing-member guide structure according to claim 4, wherein:
   the guide member is a first guide member closer to the first wall portion between the first wall portion and the second wall portion;
   the routing-member guide structure further comprises a second guide member closer to the second wall portion between the first wall portion and the second wall portion;
   the first routing member is routed between the first wall portion and the first guide member;
   the second routing member is routed between the first guide member and the second guide member; and
   a third routing member is routed between the second guide member and the second wall portion.

6. The routing-member guide structure according to claim 5, wherein
   the second guide member is extended in a direction intersecting an extending direction of the second routing member and is offset from the first guide member in the extending direction of the second routing member.

7. The routing-member guide structure according to claim 1, wherein:
   the first routing member is routed on one side surface side or another side surface side of the movable member from between the first wall portion and the second wall portion; and
   the routing-member guide structure comprises a clamp member to clamp the first routing member routed on the one side surface side or the other side surface side of the movable member.

8. A working machine comprising:
   a machine body;
   the routing-member guide structure according to claim 1;
   a support bracket defining the fixed-side member provided at the machine body; and
   a swing bracket, defining the movable member, supported by the support bracket to be rotatable around a pivot whose axis extends in an up-down direction.

* * * * *